(No Model.)   3 Sheets—Sheet 1.
W. E. CHEESEMAN.
TRANSPLANTER.
No. 602,894.   Patented Apr. 26, 1898.
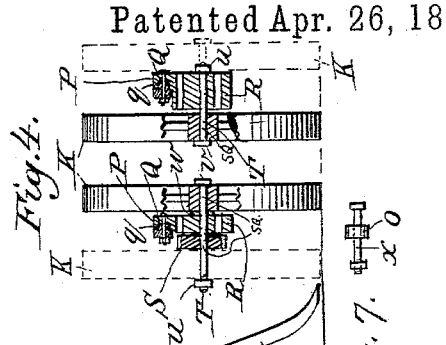
Fig. 4.  Fig. 7.
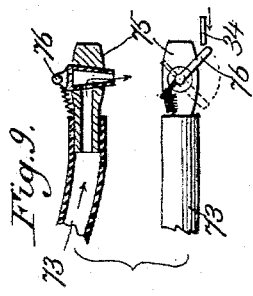
Fig. 9.  Fig. 8.
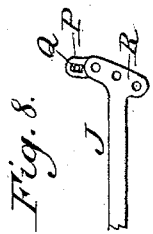
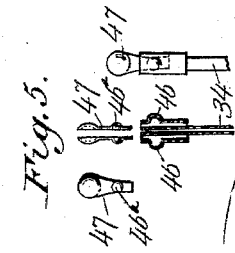
Fig. 5.  Fig. 1.
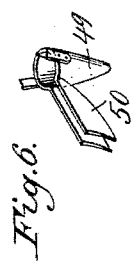
Fig. 6.
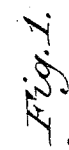
Fig. 3.
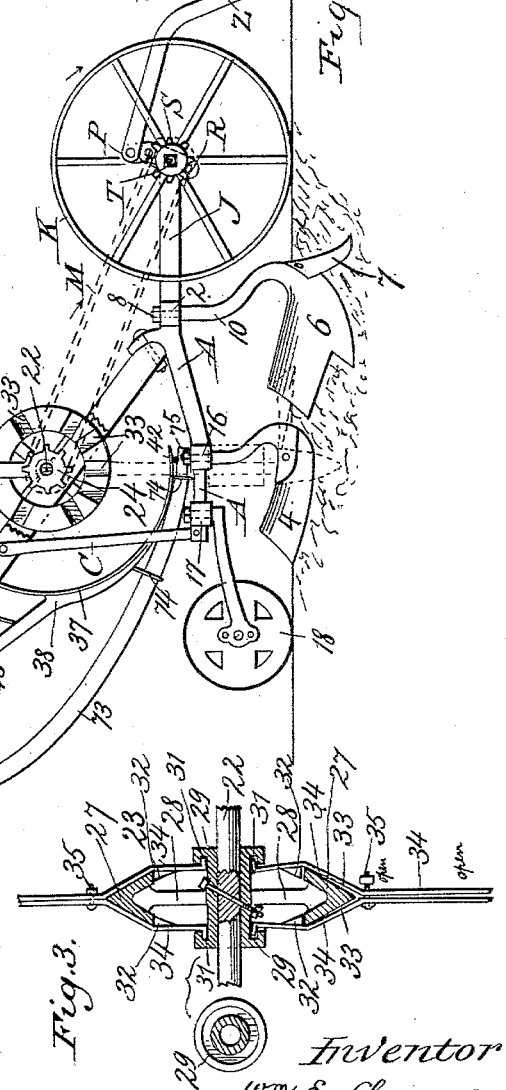
Attest:
F. H. Schott
S. G. Hopkins.
Inventor
Wm E. Cheeseman
By Thos. S. Hopkins,
Atty.

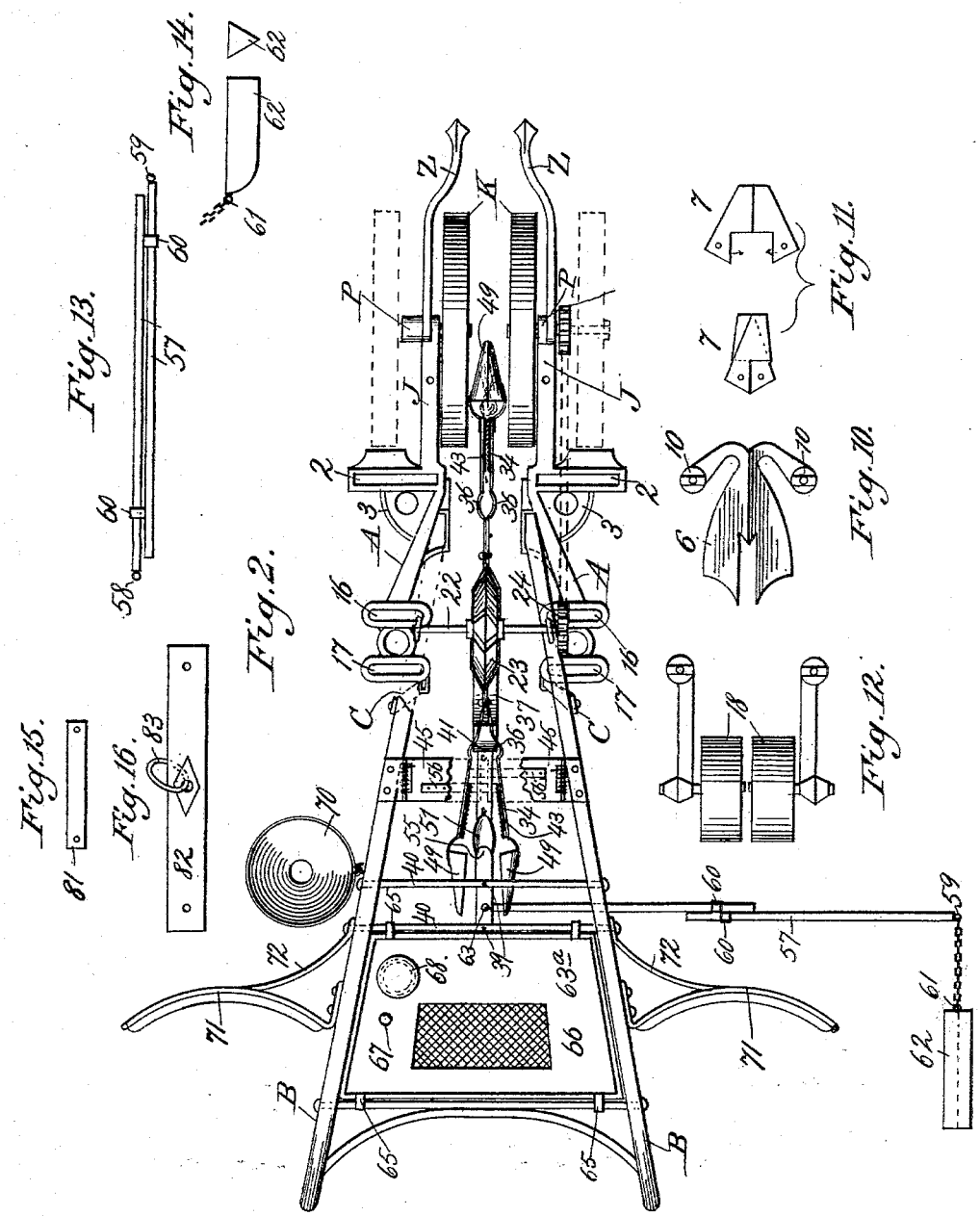

(No Model.)  
3 Sheets—Sheet 3.
W. E. CHEESEMAN.
TRANSPLANTER.
No. 602,894.  
Patented Apr. 26, 1898.
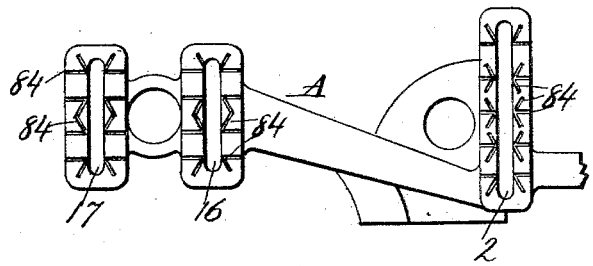
Fig. 17.
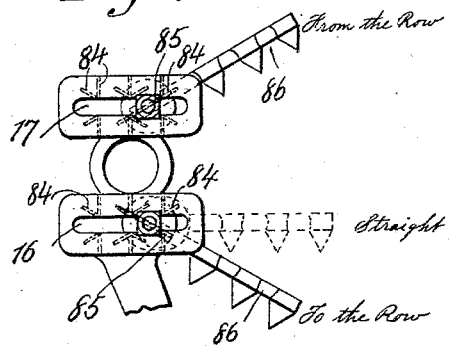
Fig. 18.
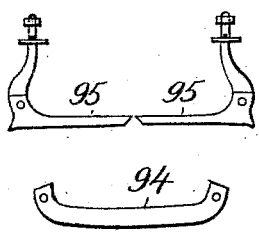
Fig. 21.
Fig. 22.
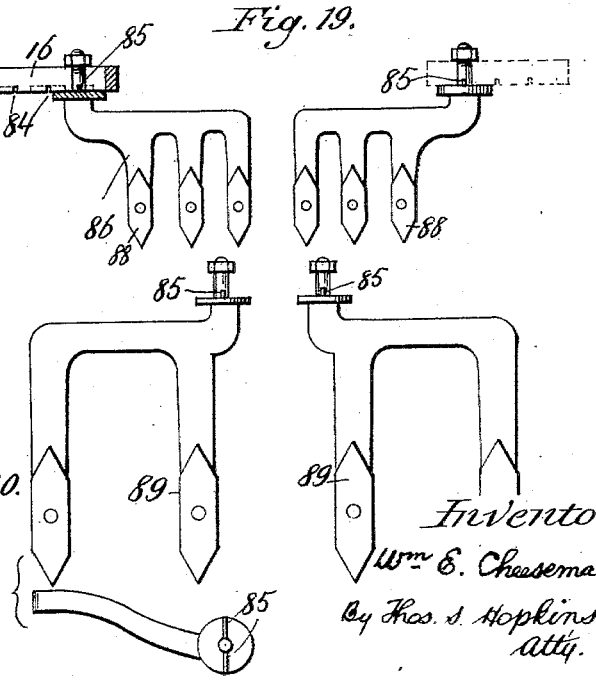
Fig. 19.
Fig. 20.
Attest:  
F. H. Schott  
J. G. Hopkins.
Inventor:  
Wm. E. Cheeseman,  
By Thos. S. Hopkins,  
Atty.
THE NORRIS PETERS CO., PHOTO-LITHO., WASHINGTON, D. C.

UNITED STATES PATENT OFFICE.

WILLIAM E. CHEESEMAN, OF FREEHOLD, NEW JERSEY.

TRANSPLANTER.

SPECIFICATION forming part of Letters Patent No. 602,894, dated April 26, 1898.

Application filed September 10, 1896. Renewed October 6, 1897. Serial No. 654,280. (No model.)

*To all whom it may concern:*

Be it known that I, WILLIAM E. CHEESEMAN, a citizen of the United States, residing at Freehold, in the county of Monmouth and State of New Jersey, have invented certain new and useful Improvements in Transplanters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in that class of transplanters designed to be driven along the ground and to automatically set out the plants in the hills or rows and in a hollow or on a ridge; and its object is to provide an improved construction of the same which shall possess superior advantages with respect to range of work or results produced and also with regard to efficiency in operation.

The invention consists in the novel construction and combination of parts hereinafter fully described and claimed.

In the accompanying drawings, Figure 1 is a vertical sectional view of a transplanting-machine constructed in accordance with my invention. Fig. 2 is a top view of the same with the plow, covers, rollers, and chain removed. Fig. 3 is a detail transverse section showing the axle, the band and spokes, and the fingers. Fig. 4 is an elevation, partly in section, of the front wheels. Fig. 5 represents detail elevations and sectional views of the onion-setting clamps. Fig. 6 is a detail sectional view of the dibber. Fig. 7 is an elevation of the short bolt which is substituted for the bolt shown in Fig. 4 when the sprocket-wheel on said last-mentioned bolt is not in use. Fig. 8 is a detail elevation of one of the forwardly-extending arms and the adjustable segmental head for the axle of the front driving-wheel. Fig. 9 shows a sectional view and an elevation of the rubber tube and spring suction-cap. Fig. 10 is a plan view of the two-part plow. Fig. 11 shows the standards secured to said two-part plow. Fig. 12 is a plan view of the rollers and standards connected with the frame of the machine. Fig. 13 is a detail view of the folding marker. Fig. 14 is a detail view of the three-cornered dog. Fig. 15 is a detail view of the band employed when the machine is used as a wheel-hoe. Fig. 16 is a detail view of the band and ring for horse-power when the machine is doubled in size. Fig. 17 is a detail elevation showing the slotted cross-sections secured to the frame of the machine. Fig. 18 is a detail plan view of the same. Fig. 19 shows a detail sectional view and elevation thereof. Fig. 20 represents detail views of the plows. Fig. 21 is a detail view of the hoes for the side rows. Fig. 22 is a similar view of the connecting-hoes.

In the said drawings the reference-letters A A designate the frame of the machine, and B B handles secured thereto at their lower ends, and C a brace bolted to each handle and to the frame. The said lower ends of the handles engage in slots in the frame and are held in place by a single bolt. Secured to said frame are two forwardly-extending arms J J, provided at their front ends with segmental heads R, provided with a number of holes in which are inserted the axles of the driving-wheels K. By this means the height of the frame can be adjusted without throwing the chain which runs the wheels out of engagement therewith. These heads are provided with a projection P and an insink Q to strengthen the same.

The letter S designates a sprocket-wheel on the detachable bolt connected with the axle of one of the wheels K. This bolt T is provided with three burs, one at $w$ to keep the chain clear for reversing the wheels, another at $v$ for the same purpose, and still another at $u$ to hold the wheel when reversed. The bur $w$ is very flat and set in as much as possible, as the left-hand bolt uses but two burs. A shorter bolt $x$, with a sleeve $o$, is used when the sprocket-wheel is not in use. The box or opening in the right-hand wheel is squared, as are also the bolts T and X to engage therewith and turn the sprocket-wheel. Fig. 2 shows the wheels closed together for setting plants on a ridge or in a hollow. The dotted lines show the wheels spread apart for straddling a ridge or row.

The letters Z Z designate guards running along the ground in advance of the machine for removing stones and other obstructions and leveling the ground in advance of the wheels and keeping the plows at the right depth. These guards are made partly of steel and shaped to raise the stones and are bolted to the projections P.

The frame A is formed with openings 2, and the numerals 3 3 designate tapering braces for strengthening the frame.

The numeral 6 designates the plow, so constructed as to open a broad or narrow furrow and can be raised or lowered with the wheel. This plow is made in two parts provided with standards 10, which are inserted in the slots or openings 2 of the frame and secured in place by burs 8. Secured to said plow is a detachable casting 7, also made in two parts and is only used on hard ground or where a furrow needs broadening or cleaning.

The numeral 4 designates covers made in two parts riveted together and provided with standards, the upper ends of which engage in slots 16 in the frame A and are held in place by burs or nuts.

The numeral 18 designates rollers provided with standards which engage the slots 17 in the frame A or with the slots 16, as it is desired to press the dirt against the row in a slight ridge for large plants that need "holding" or for small plants that need "hollowing." These plows, covers, and rollers may be brought close together or spread apart, according to the requirements of the work.

The numeral 22 designates a loose axle carrying the plant-wheel 23 and is provided with a sprocket-pinion 24, with which engages a sprocket-chain M, also engaging with the sprocket S. Said axle is journaled to the handles B of the machine. The plant-wheel or finger-holder 23 is a casting consisting of a tapering band 27, pointed at its outer edge and broadened at its inner edge, provided with spokes 28, joined to the axle 22, with extra castings 29, grooved on the inner side to hold the fingers 34 at 31. The spokes 28 are cast in the center of the band 27, thus leaving an inside circle for the caps 32 to revolve in.

The numeral 33 designates eight grooves in the hollow band 27 and serve to hold the steel fingers 34, which are forced into the grooves by tightening the bolt 35. By loosening this bolt the fingers may be slid from one groove to another without removing the bur of the bolt, the caps 32, playing under the band 27, holding the spring down, and the curve or catch 31, working in the hollow sleeve 28$^a$, preventing from springing out at the base. The sleeves 28$^a$ are connected with the spokes 28 and a part of the wheel 23, the whole being of one casting and held by a single bolt passing through the axle.

The numeral 37 designates a spreader secured to a support 38, bolted by bolts 39 to rods 40 of the handles B B. This spreader is squared at the end 41 and pointed at 42 to catch and spread the spring at 36, where it is bulged to receive it.

The numeral 43 designates a steel clamp or holder riveted to springs 34 and contains rubber stretched across its inner side to act as a cushion to prevent breaking or mashing the plants. A sharp knife 44 extends along the edge to remove hanging or projecting leaves, which would otherwise drag the plant out of position as the clamp came in contact with the check-bridge 45.

The numeral 47 designates onion-setting clamps, which are detachable and held in place by hollow steel bulges 46, which give and receive the clamp 47, that is hollowed to better hold the clamp. There are five of these clamps 47 to fit the five plant-clamps 43, which are secured to five steel springs 34, making five fingers in all, besides which there are two extras for hill setting that contains a plant-holder 43 without a bulge and a divided dibber 49 with a cover or scraper 50 to cover up the opening left by the expanded dibber as it passes out of the ground. Fig. 2 shows the dibber in use and in the act of closing on the hollow plate or cup 51, which holds the root of the plant and is cut away at 55 and hinged with a spring at the opposite end, that it may regain its position after leaving the dibber, from which it slides, as outlined at 53. The three little onion-needles 52, on which the onions are stuck on their side, top downward, engage the stem of the plant, and with the root resting on the plate 51 holds it until caught at the top by the clamps 43. If a very large plant, the prongs with needles 54 will hold it straight until caught by the clamps. To prevent the plants from being displaced by the rapid movement of the fingers, a check-bridge 45, with spring-hinges to keep it in place, is provided with a lap 56, which enables it to remain up long enough to place another plant, then falls to hold it down until caught by the clamps.

The numeral 57 designates a folding marker held by bands 60 and by the ring 58 to a hook 63 on the machine, has a chain attached to a ring 59, which is secured to ring 61 of a three-cornered dog 62. The water-tank and plant-box 63, held together by bolts 54, are set in the handles B B and held by projections 65, attached to the box, contains a false bottom 66, lifted by a knob or button 67. There is an opening in the false bottom 66, closed by a cap 68 and provided with a funnel 70, which will allow the perfect watering of the plants to be set without flooding the box. The arms 71 are broad and padded and braced by rods 72 and secured to the handle by two bolts each. A rubber tube 73, held by two bands 74 to the under side of the spreader 37 and by a set-screw 78 to the box 63, contains a faucet 75 directly under the spreader and over the plant as it is "let go" and covered, thus making it impossible for the water to miss. At exactly the right moment the right-hand side of spring 34 strikes a spring suction-cap 76 in the faucet 75. The suction-cup works up through an opening of the tube and is forced out by striking a trip 79, that is sprung straight, forcing the cap 76 in by a spring 77. A spigot 80 beneath regulates the flow of water.

Fig. 3 shows an inverted and enlarged section of Fig. 2 with a band 81 to be substituted for the axle 22 when the machine is in use as a wheel-hoe, and a band 82, with ring 83, for horse-power when the machine is doubled in size. The cross-sections 84 on the under side of the frame A and surrounding the slots 2 are grooves for holding the lug 85 on the ends 86 of the plows, hoes, coverers, and cultivators, all of which may be set straight to or from the row. The long hoes 95 are for side rows, while the connecting-hoe 94 makes an excellent onion-harvester.

The plows are the same as used on other wheel-hoes, except that the standards are not so high. The little cultivator-teeth 88 are for very delicate work, while the large teeth 89 are for heavy work.

Having thus fully described my invention, what I claim is—

1. In a transplanting-machine, the combination with the plant-wheel 23 the spring-fingers 34, the hollow band 27, the cap 32, the catch 31, the spokes 28 and the hollow sleeve 28ª substantially as described.

2. In a transplanting-machine the combination with the plant-wheel constructed as described, the spring-fingers 34, the spreader 37, the clamp 43, the knife 44, the check-bridge 45, the bulge 46, the clamps 47, the dibber 49, the cover on scraper 50, the hollow plate or cup 51 and the needle 52 of the tank and plant-box 63 having false bottom 66, with an opening therein covered by the cap 68, the funnel 70, the rubber tube 73, the faucet 75, the suction-cap 76, the trip 79, cap 76 and spring 77 substantially as described.

In testimony whereof I have affixed my signature in presence of two witnesses.

WILLIAM E. CHEESEMAN.

Witnesses:
JOSEPH NODOCKER,
CHRISTOPHER NODOCKER.